United States Patent [19]

Chandler

[11] B 4,011,626

[45] Mar. 15, 1977

[54] MEANS FOR POSITIONING A LONGITUDINAL BEARING

[75] Inventor: Roy L. Chandler, Tarrant County, Tex.

[73] Assignee: L. Ray Wood, Arlington, Tex.

[22] Filed: Apr. 7, 1975

[21] Appl. No.: 565,754

[44] Published under the second Trial Voluntary Protest Program on March 30, 1976 as document No. B 565,754.

Related U.S. Application Data

[62] Division of Ser. No. 327,426, Jan. 29, 1973, Pat. No. 3,891,132.

[52] U.S. Cl. .................................. 16/129; 16/152; 293/99
[51] Int. Cl.² ........................................... E05D 7/04
[58] Field of Search ............ 16/129, 130, 131, 132, 16/133, 134, 137, 152, 156; 308/31, 32, 33, 29; 293/64, 65, 66, 67, 69 R, 99, 100; 224/42.03 B, 42.08; 403/4, 84, 103

[56] References Cited

UNITED STATES PATENTS

| | | | |
|---|---|---|---|
| 2,010,468 | 8/1935 | Spencer | 16/152 X |
| 2,146,912 | 2/1939 | Phipps | 293/65 |
| 2,622,266 | 12/1952 | Stehle | 16/132 |
| 2,708,286 | 5/1955 | Tollefson | 16/152 UX |
| 3,107,390 | 10/1963 | Shelton | 16/152 |
| 3,891,132 | 6/1975 | Chandler | 224/42.03 B |

*Primary Examiner*—H. Hampton Hunter
*Assistant Examiner*—Wayne L. Shedd
*Attorney, Agent, or Firm*—Charles W. McHugh

[57] ABSTRACT

An apparatus for adjusting the inclination of a longitudinal bearing, comprising a fixed structure having at least two spaced walls which form a groove therebetween; the groove provides access for a rotatable member which may be mated with the bearing. An aperture of a size to snuggly fit the bearing is provided in a first one of the walls; a slot having a size larger than the aperture is provided in the second of the two walls, the slot being opposite the aperture in first wall and extending in a certain direction. A flange extends away from the second wall in a direction perpendicular to the opening of the groove, with said flange having an opening which lies in the plane defined by the aperture in the first wall and the slot in the second plane defined by the aperture in the first wall and the slot in the second wall. An L-shaped member has a cylindrical bearing surface along a first leg (which constitutes the longitudinal bearing) and an irregular surface along the second leg. The first leg is adapted to engage the aperture and also to span the gap between the aperture and the slot, and the second leg is adapted to extend from the slot through the flange opening. A fastening means is provided for firmly securing the L-shaped member to the flange, including means for engaging the irregular surface on the second leg when said leg is inserted into the flange opening. When the irregular surface constitutes simply threads, the fastening means may be two nuts that are engaged with the threads on opposite sides of the flange. The inclination of the first leg with respect to the groove is adjustable in accordance with which portion of the second leg's irregular surface is utilized in securing the L-shaped member to the flange.

8 Claims, 6 Drawing Figures

MEANS FOR POSITIONING A LONGITUDINAL BEARING

This application is a division of application Ser. No. 327,462, filed Jan. 29, 1973, now U.S. Pat. No. 3,891,132, issued June 24, 1975.

This invention relates to a construction including a pivot axis, wherein the inclination of the pivot axis with respect to an adjacent structure is easily adjustable-with the result that any structure (such as a gate, door, arm, etc.) which pivots about the axis can be correspondingly adjusted.

There are many instances in which there is a need for a given member (such as a gate or cantilevered rail) to be rotated with respect to some fixed structure. For example, in U.S. Pat. No. 3,891,132 issued to the same inventor named herein and assigned to the same assignee, there is disclosed a bicycle carrier for attachment to a motor vehicle such as an automobile or truck. This bike carrier is particularly noteworthy in that it can swing in a generally horizontal direction away from the vehicle about a pivot axis at one end of the carrier. The carrier is also noteworthy in that it is adapted to transport either one or two bicyles. Since the rail of the carrier is mounted in a cantilevered fashion, it will no doubt be appreciated that the rail might swing through an arc that is a bit lower when there are two bicyles on the rail, as compared with the arc it traverses when there is only one bicycle on the rail. That is, the amount of load on a horizontally cantilevered rail will have an influence on the vertical deflection that the rail will exhibit at its distal end. While there may well be an obvious (though only partial) solution to this problem of variable deflection with variable load, with said partial solution being to make the pivot axis and the cantilevered rail more massive and more rigid, such a solution typically introduces its own liability of adding even more weight to a construction that needs reinforcing in the first place because of the presence of more external weight. Hence, a more expeditious solution is desirable, and it is believed to be possible by making adjustments in the pivot axis as desired in order to make a cantilevered body rotate through a desired spatial arc. Accordingly, it is an object of this invention to provide a construction which makes possible a relatively simple and reliable adjustment in the inclination of the axis of a longitudinal bearing.

A further example of an instance wherein the orientation of a longitudinal bearing may require adjustment has nothing to do with a variable load that may be applied to a cantilevered structure; rather it is a case wherein two spaced hinges are to be installed on a structure such as a common door to a room or an automobile. It will obviously be appreciated that the two spaced hinges will be effective to permit rotation of the door only if they are installed so that their longitudinal axes lie along substantially the same straight line. Indeed, if there is no clearance or looseness in the hinges, they may not function at all unless their axes are exactly coincident. That is, the accuracy with which two spaced hinges must be aligned is directly related to the precision with which the hinges are made. But, regardless of the quality of the hinges, no doubt it will be recognized that a construction which would foster the easy alignment of two spaced hinge pins would have very pronounced benefits. And, it is an object of this invention to foster just such an adjustment in either one or both of two spaced bearings (hinge pins).

These and other objects and advantages will be apparent from the specification and the drawings provided herewith.

In brief, the apparatus constitutes a means for adjusting the inclination of a longitudinal bearing, comprising a fixed structure having at least two spaced walls which form a groove therebetween. The groove provides access for the rotatable member which is to be mated with the bearing. An aperture of a size to snuggly fit one end of the bearing is provided in a first one of the walls; a slot having a size larger than the aperture is provided in the other wall, with the slot being opposite the aperture in first wall and extending in a particular direction. A flange extends away from the second wall in a direction perpendicular to the opening of the groove, with said flange having an opening which lies in the plane defined by the aperture in the first wall and the slot in the second wall. An L-shaped member has a cylindrical bearing surface along a first leg (which constitutes the longitudinal bearing) and an irregular surface along the second leg. The first leg is adapted to engage the aperture and also to span the gap between the aperture and the slot; and the second leg is adapted to extend from the slot through the flange opening. A fastening means is provided for firmly securing the L-shaped member to the flange, including means for engaging the irregular surface on the second leg when said leg is inserted into the flange opening. When the irregular surface constitutes simply threads, the fastening means may be two nuts that are engaged with the threads and positioned on opposite sides of the flange. The inclination of the first leg with respect to the groove is adjustable in accordance with which portion of the second leg's irregular surface is utilized in securing the L-shaped member to the flange.

To perhaps best illustrate the concept of the pivotal structure disclosed herein, it will be described as applied to a bicycle carrier, wherein one or two bicycles are mounted on a pivotal rail that swings outwardly from a vehicle in a generally horizontal direction. In FIG. 2, a bicycle rail 62 is pivotally mounted at the left end of the vehicle bumper 26, and supported at its distal end during travel by the structure 104 (which is fixed to the vehicle's frame). Whether the rail 62 could be swung away from structure 104 without applying a significant lifting force, or subsequently swung back into the rest position without having to lift it much, will depend to a certain extent upon the weight that is mounted on cantilevered rail 62. That is, if the axis of rotation about which rail 62 rotates had been permanently established when the carrier 20 was empty, placing one or two bicycles on the rail 62 might cause the same to sag so much that it would not easily mate with the supporting structure 104. To solve this problem, an apparatus like that shown in FIG. 1 is advantageously provided.

Figure 1:
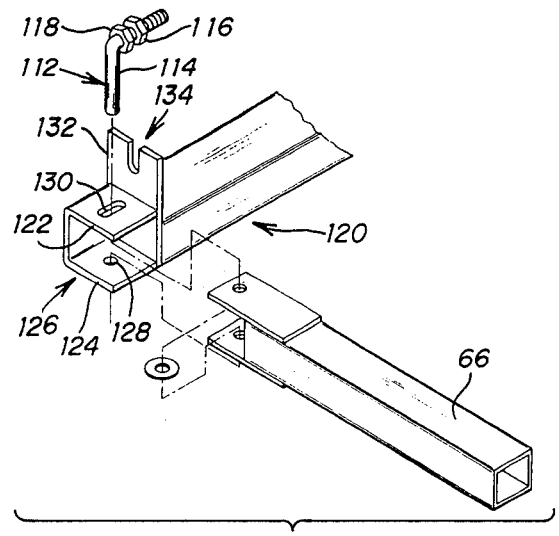
FIG. 1 is an exploded, perspective view of a rotatable connection whose axis of rotation is adjustable in a simple manner.
Figure 2:
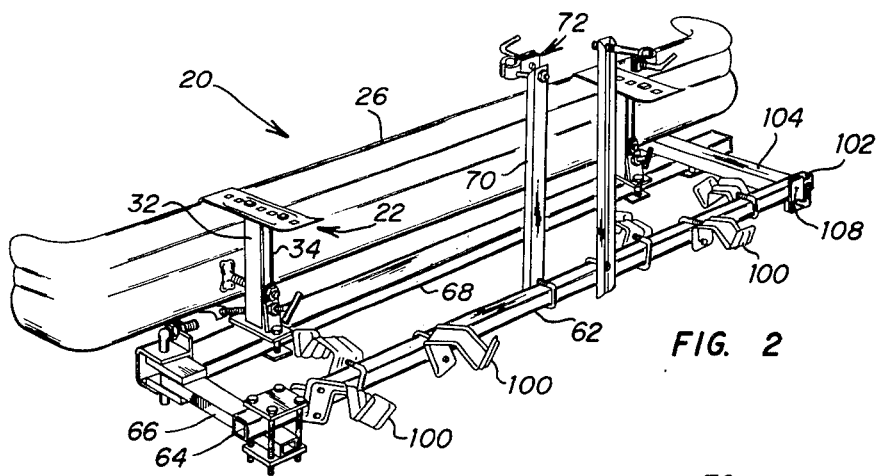
FIG. 2 is an elevation view of a mounting bracket as viewed from one end of an adjacent bumper.

Referring specifically now to FIG. 1, a fixed structure 120 is provided, said structure having at least two spaced walls 122, 124 forming a groove, opening or channel 126 therebetween. Said groove 126 is designed to provide clearance for a rotatable member; when used here in conjunction with a bicycle support rail, the rotatable member may be arm 66 to which the rail 62 is affixed. An aperture 128 is provided in the lower of the walls 124, and a slot 130 is provided in the second of the two walls 122. The slot 130 is opposite the aperture 128, and extends in a direction which is generally perpendicular to the groove 126. The slot 130 and the aperture 128 define a plane within which it is desired to adjust an axis of rotation.

A flange 132 extends upward (in this case) and away from the second wall 122 in a direction generally perpendicular to the opening of the groove. Said flange 132 also has an opening 134 which lies in the plane defined by the aperture 128 in the first wall and the slot 130 in the second wall. An L-shaped member 112 has a cylindrical bearing surface 114 along a first leg, and an irregular surface along the second leg. The first leg is adapted to engage the aperture 128 and also to span the gap between the two walls, i.e., between the aperture 128 and the slot 130. The second leg is adapted to extend from the vicinity of slot 130 and through the flange opening 134. Means are also provided for firmly securing the L-shaped member 112 to the flange 132. When the irregular surface on the second leg of the L-shaped member 112 constitutes a threaded surface (as shown), the means for securing the L-shaped member to the flange 132 will naturally constitute nuts or other internally threaded elements. A first nut 116 may be conveniently referred to as a leveling nut, since it is the one which primarily dictates the inclination of L-shaped member 112, which in turn dictates both the angle at which arm 66 is mounted and the inclination of rail 62.

To adjust or "level" the cantilevered rail 62, nut 116 is selectively moved along the threads of member 112. As nut 116 is moved, the inclination of bearing surface 114 with respect to structure 120 is correspondingly varied. Once a suitable inclination has been achieved, the second nut 118, appropriately called a "jam" nut, is turned to tightly secure the L-shaped member 112 to the flange 132. When the opening 134 extends to an edge of flange 132 (as shown), the L-shaped member 112 can be removed from the apparatus (for inspection or replacement) by simply loosening the jam nut and lifting said member simultaneously away from the flange opening 134 and the aperture 128. If the opening 134 did not extend to the edge of the flange 132, and if the flange were to be welded onto the structure after pivot pin 112 was in place, the pivot pin would be precluded from removal. This would also serve to permanently hold next to the groove any rotatable structure having a bore through which the pivot pin is inserted. One advantage of such a construction is that it could make very difficult the unauthorized removal of a rotatable structure (such as a bicycle rail, door or gate) but would not interfere with adjustment of the "swing" of such a structure. Another advantage of the basic apparatus is its simplicity, since a single structural member (i.e., the L-shaped pin 112) provides both a bearing surface and a means for adjusting the inclination of the very same bearing surface.

Figure 3:
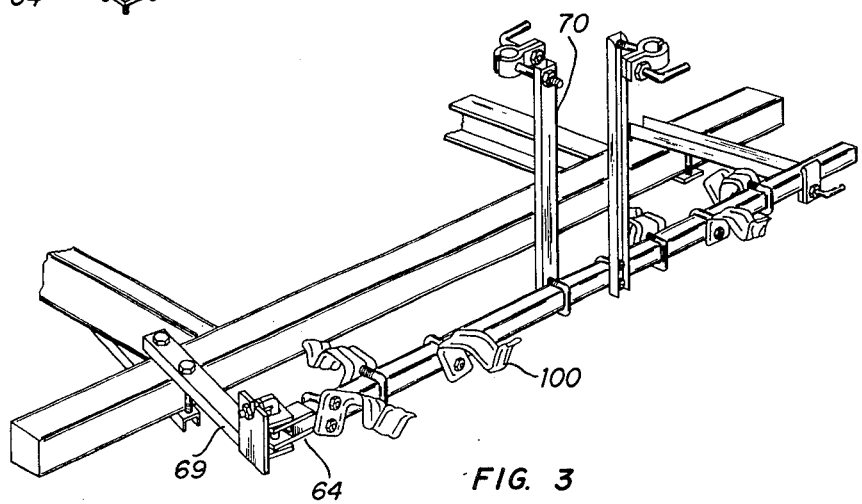
FIG. 3 is a perspective view of a bicycle carrier bolted to the bumper of a vehicle.

Another embodiment of the pivotal mounting of a bicycle rail is shown in FIG. 3. In that figure, an arm 69 is bolted directly to a bumper at the rear of the vehicle's chasis. A rotatable connection is provided at the proximate end 64 of the rail 62, and typical posts 70 and wheel brackets 100 are shown installed thereon.

Of course, the same principle that applies in the case of positioning a bearing 114 for a cantilevered rail would also apply to the positioning of a conventional hinge pin. Thus, when the inclination of a hinge pin is important—as it usually is when two hinges are widely spaced and their axes must be coincident, then the construction shown herein will serve to permit a quick and reliable adjustment of the hinges, such that they can work in unison to foster the smooth rotation of any gate or door suspended thereon.

As an example of the utility of the invention when two longitudinal bearings are to be positioned so that they are co-axial, reference will now be made to FIG. 4 which illustrates two L-shaped members 112A, 112B that are spaced from one another by a substantial distance, e.g., a distance greater than the length of one of the L-shaped members. In order to most expeditiously accomplish the desired positioning of the two members, it is preferred that one of the members be oriented within a first plane, e.g., a north-south plane. The other L-shaped member would be oriented such that its threaded leg is perpendicular to the plane defined by the first L-shaped member, i.e., it would lie in an east-west plane. The two smooth (bearing) portions of the L-shaped members 112A, 112B would lie along two axes that initially would be expected to be nearly coincident; at least they would extend in the same general direction. After suitable adjustment of nuts 116A, 116B, the axes can, of course, be made to be exactly coincident.

Figure 4:
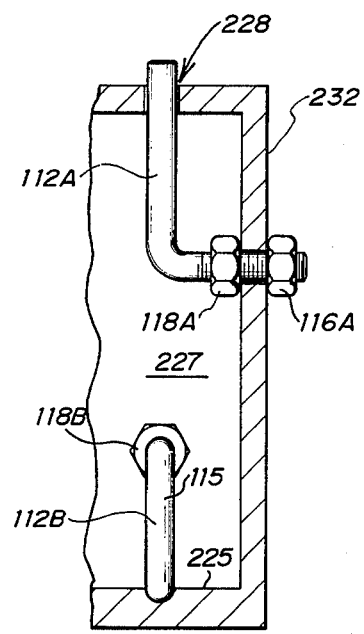
FIG. 4 is a view partly in cross-section of two alternate arrangements for positioning the bearing means 112 of FIG. 1.
Figure 5:
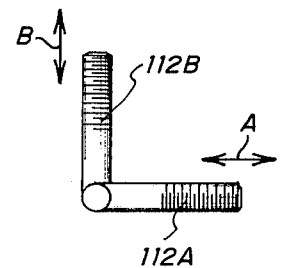
FIG. 5 is another alternate arrangement for positioning the bearing means 112 of FIG. 1.

FIG. 5 is a diagrammatic illustration of the relative orientation of two spaced L-shaped members 112A, 112B—like those in FIG. 4—which are shown with their bearing portions exactly aligned, and their irregular (threaded) portions being arranged generally 90° apart. The threaded portions or rods would be moved in directions parallel to their axes, i.e., in the directions of the respective arrows, to effect alignment of the two bearing portions.

Figure 6:
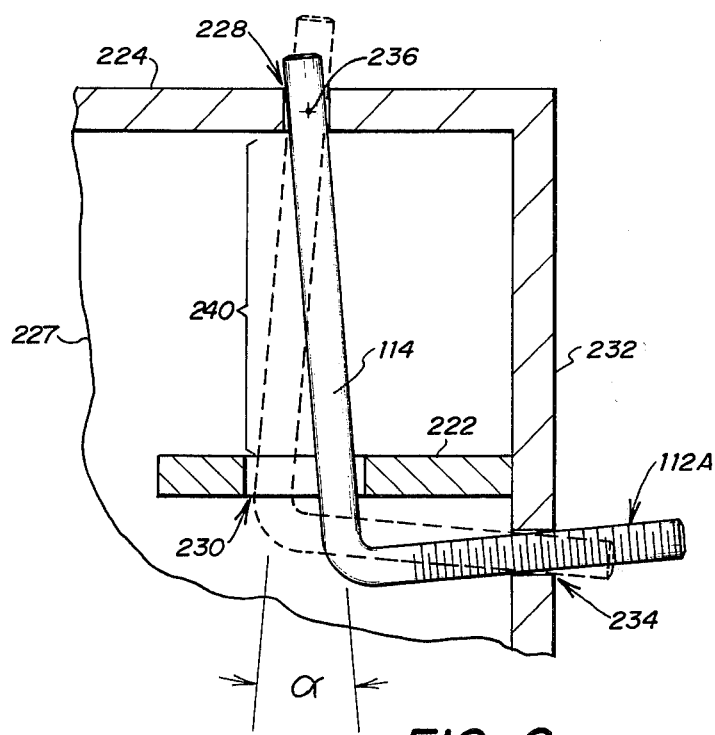
FIG. 6 is a further alternate arrangement for positioning the bearing means 112 of FIG. 1.

FIG. 6 is a graphical illustration of the range of adjustment that is possible with a given construction. Of course, it will be recognized that the construction shown in FIG. 6 is similar to the upper half of FIG. 4, wherein the bearing portion of the L-shaped member 112A is vertical and the threaded portion is horizontal. When an adjustment nut is moved toward the bearing surface 114, that surface will be caused to swing to the right (in FIG. 6) about a pivot point 236. Conversely, if the adjustment nut is moved away from the bearing surface 114 (and the jam nut is similarly moved away from said bearing surface), then the longitudinal axis of the member 112A will swing to the left, as shown in FIG. 6. The size of the angle $\alpha$ between the two extreme positions of the L-shaped member 112A will be determined, at least in part, by the amount of clearance between the threaded leg of the member 112A and the aperture 234 in flange 232. (Actually, the angle $\alpha$ in FIG. 6 is illustrated somewhat larger—for clarity—than would normally be the case...for most constructions.)

Another factor will, of course, be the degree of free pivotal motion that is permitted about the upper pivot point 236. If the upper end of the member 112A is constrained against significant rotation because of the proximity of the bounding walls of aperture 228, then it could be this relationship (rather than the size of flange opening 234) that establishes the limits of adjustment. Of course, a person skilled in the art would be able to discern an ideal sizing for the respective members and apertures, pivot points, etc., such that the limits of movement of the member 112A are reached at an optimum time.

With continued reference to FIG. 6, the L-shaped member 112A is shown as being held captive by the walls 232, 224, such that it would not be lost even if the outer nut (not shown in this figure) was completely removed from the threaded rod. Of course, in order to have this non-loss capability, it is necessary that the L-shaped member be inserted through the respective apertures 228, 234 prior to the rigid connection of walls 224, 232. Alternatively, the walls 224, 232 may be joined to from a unitary housing, and then the L-shaped member may be bent to its final "L" shape after its two ends have been inserted through apertures 228, 234.

In the event that the force of gravity is available to help hold a L-shaped member in place, it may not even be necessary to have the elongated portion of the member extend completely through an aperture, such as aperture 228. As shown in FIG. 4, an alternate manner of providing an "anchor" for the "pivot" end of the member 112B is provided with a convex portion on the member 112B and a concave recess on the bottom wall 225. As long as there is at least some restraint against sideward movement of the member 112B (as viewed in FIG. 4), the nuts—when tightened—will rigidly lock the member 112B to the wall 227; then the member 112B will serve its intended purpose as a longitudinal pin or bearing about which a gate or the like can rotate. Indeed, were it not necessary to insure that the leg 114 *rotate* with respect to wall 225 (rather than merely translate with respect thereto, as the two nuts are selectively positioned), such a recess or aperture in wall 225 would not be necessary. That is, it is an essential facet of the invention that there be structure for restraining one end of the L-shaped member so that it pivots when the other end is moved in the plane defined by the L-shaped member.

Referring again to FIG. 6, to reduce at least some of the stress that would be imparted to two adjusting nuts if substantial torque loads were to be applied to the bearing surface 114, it is advantageous to provide a bracing structure such as wall member 222. Such a member 222 would be rigidly secured to the back wall 227 in a suitable manner, as by welding or the like. The space 240 between wall members 222, 224 is where a cylindrical hinge member would typically envelop the leg 114. The opening or slot 230 in wall 222 is significantly larger than the diameter of leg 114, such that there is substantial clearance provided between these two elements in a direction generally parallel to the threaded portion; naturally, this clearance is provided in order that the L-shaped member may be adjustably positioned with respect to wall 232. As for side clearance, i.e., clearance in a plane perpendicular to the plane of the drawing, the degree of clearance will determine the amount of sideward support given L-shaped member 112A as it is subjected to torque loads. Hence, if there is essentially zero clearance between leg 114 and the sides of aperture 230, then wall 222 will support leg 114 at one end of gap 240 and parallel wall 224 will support it at the other end. Contrariwise, if there is a substantial clearance between leg 114 and the sides of aperture 230, then the leg 114 will be supported only between the two perpendicular walls 224, 232—and more specifically, between the aperture 228 in wall 224 and the aperture 234 in wall 232. In the later case, of course, the two adjustment nuts constitute the means for preventing any sideward movement of leg 114 as well as the means for inclining the leg with respect to wall 232.

It should also be noted that the technique for adjusting longitudinal bearings as described herein is not restricted to adjusting only vertical bearings; horizontal or inclined bearings can also be quickly and easily aligned using the same concept. Too, the two walls or plates 227, 232 (FIG. 4) with respect to which the two members 112A, 112B are positioned need not be exactly perpendicular—although it will surely be appreciated that that relationship will likely make the adjustment process more direct and probably faster.

While only two preferred embodiments of the invention have been disclosed in great detail herein, it will be apparent to those skilled in the art that modifications thereof can be made without departing from the spirit of the invention. Thus, the specific structures shown herein are intended to be exemplary and are not meant to be limiting, except as described in the claims appended hereto.

What is claimed is:

1. Apparatus for adjusting the inclination of a bearing surface, comprising:
   a. fixed structure having at least two spaced walls forming a groove therebetween, said groove providing access for a rotatable member which may be mated with the bearing surface;
   b. an aperture in a first one of the walls;
   c. a slot in the second of the two walls, the slot being opposite the aperture in first wall, and said slot extending in a direction which is generally perpendicular to the groove;
   d. a flange extending away from the second wall in a direction perpendicular to the opening of the groove, and said flange having an opening which lies in the plane defined by the aperture in the first wall and the slot in the second wall;
   e. an L-shaped member having a cylindrical bearing surface along a first leg and an irregular surface along the second leg, with the first leg being adapted to engage the aperture and also to span the gap between the aperture and the slot, and the second leg being adapted to extend from the slot through the flange opening; and
   f. means for firmly securing the L-shaped member to the flange, including means for engaging the irregular surface on the second leg when said leg is inserted into the flange opening, and the inclination of the first leg with respect to the groove being adjustable in accordance with which portion of the second leg's irregular surface is utilized in securing the L-shaped member to the flange.

2. The apparatus as claimed in claim 1 wherein the irregular surface on the second leg constitutes convolutions which are serially connected in the manner of a threaded member, and wherein the means for securing the L-shaped member to the flange comprises at least one internally threaded member.

3. The apparatus as claimed in claim 1 wherein the opening in the flange extends in a direction generally paralleling the axis of the aperture in the first wall, and said opening extends to an edge of the flange, whereby the L-shaped member can be removed from the apparatus by pulling said member simultaneously away from the flange opening and the aperture in the first wall.

4. Apparatus for adjusting the relative inclination of two longitudinal bearings which are separated axially, comprising:
   a. a first threaded rod rigidly connected to one end of a first longitudinal bearing in such a manner as to establish a generally L-shaped member;
   b. a second threaded rod rigidly connected to an end of the second longitudinal bearing in such a manner as to form a generally L-shaped member;
   c. a structural housing for supporting the two longitudinal bearings in spaced and substantially co-axial positions, and said housing having two structural plates that lie in generally perpendicular planes, with each of said plates having an aperture which is slightly larger than the diameter of the threaded rods, and the apertures being so positioned that the longitudinal bearings are at least generally aligned when the two threaded rods are initially extended through their associated apertures, and also including means for holding the non-connected ends of the bearings against sideward movement when their connected ends are moved in response the threaded rods being moved in a direction parallel to their axes, whereby the longitudinal bearings will pivot about their non-connected ends when their connected ends are moved sidewardly; and
   d. a pair of nuts for engaging each of the two threaded rods, with a respective one of each pair of nuts being on the opposite sides of and adjacent a respective structural plate, and said nuts being movable along the threaded rods to thereby induce movement of a respective threaded rod axially with respect to its associated plate, and said nuts being effective to hold the L-shaped members rigidly to their associated plates when the nuts are jammed against a plate, whereby exact alignment of the two longitudinal bearings can be effected by moving one of said threaded rods in a first direction and moving the other threaded rod in an orthogonal direction.

5. The apparatus as claimed in claim 4 and further including a structural brace appropriately mounted in the space between the two generally perpendicular plates, and said structural brace having an opening which is larger than the diameter of a longitudinal bearing, such that one of the L-shaped members may extend through said opening when it is mounted on the housing.

6. The apparatus as claimed in claim 5 wherein there is essentially zero clearance between a longitudinal bearing and said brace opening in a first direction, and substantial clearance between the longitudinal bearing and the opening in a second direction which is perpendicular to said first direction, with the second direction lying in the plane defined by the L-shaped member, whereby the brace is adapted to resist any torque loads on the bearing in a direction corresponding to said first direction.

7. The apparatus as claimed in claim 4 wherein said means for holding the non-connected ends of the bearings against sideward movement constitute apertures in the structural housing through which an end of a respective one of the longitudinal bearings extends.

8. The apparatus as claimed in claim 4 wherein the non-connected end of at least one of said longitudinal bearings has a generally convex shape, and the means for holding said non-connected end against sideward movement constitutes a complementary concave recess in the structural housing.

* * * * *